Oct. 28, 1941.    T. R. H. SCHMIDT    2,260,872
ANIMAL TRAP
Filed June 10, 1941
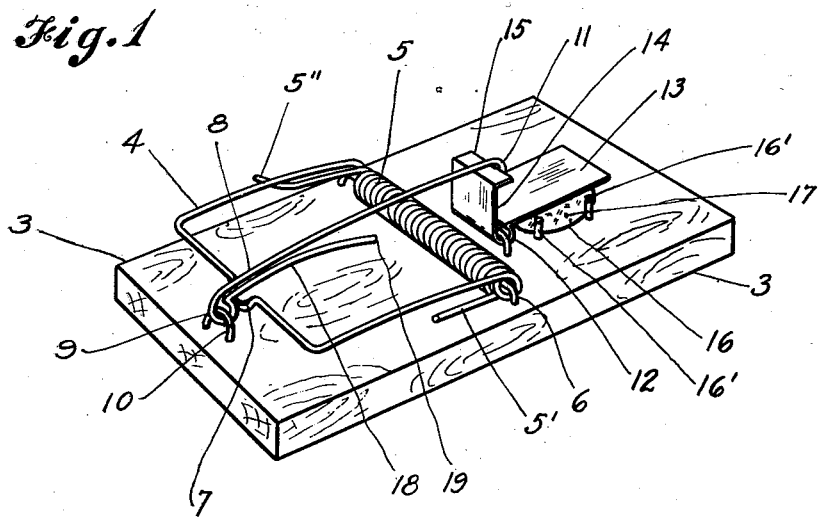
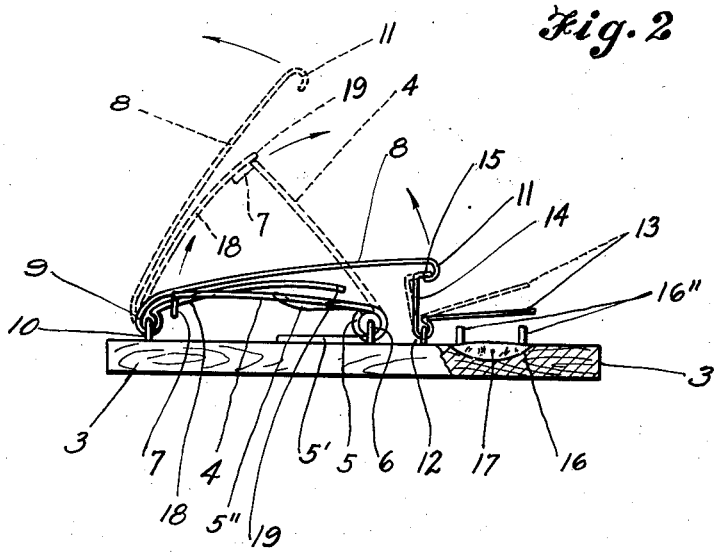
INVENTOR.
T.R.H. Schmidt
BY Edward Kemp Patented Oct. 28, 1941

2,260,872

UNITED STATES PATENT OFFICE 2,260,872

ANIMAL TRAP

Theodore R. H. Schmidt, Forks, Wash.

Application June 10, 1941, Serial No. 397,392

3 Claims. (Cl. 43—81)

This invention relates to animal traps, and particularly to traps for catching and instantly killing rats and mice.

Heretofore traps for catching animals have frequently been made with jaws for striking when sprung, to be operated by a trigger to be thrown by an animal pressing the same downward. In such construction, the traps have frequently been thrown by animals running over the same, and without being caught, or by sometimes being caught by a leg or tail, whereby the animal was not killed but merely held to suffer, or at other times animals have released themselves by gnawing off the members so held.

It is, therefore, an object of this invention to provide a trap with a trigger to be operated by raising the same and to provide means for holding a bait beneath the trigger to entice the animal to place his head beneath the trigger and in position to be certainly struck and killed by the jaw when the trigger is released by being raised by the animal. A further object is to provide a trap with a bar for retaining the striking jaw in set position with a down and backward turned hook for engaging a trigger; and also to provide a curved arm for elevating or ejecting the bar from the line of travel of the jaw when released, to prevent the hook from obstructing the jaw when sprung. A further object is to provide a loop offset at right angles in the jaw to assist the operator in setting the trap for a guide for maintaining the bar centrally over the jaw in passage. A still further object is to provide a trap that is economical to manufacture with relatively few parts which can be easily set by the operator without danger or injury from the jaw.

With these and other objects to be hereinafter stated, I have illustratively exemplified my invention by the accompanying drawing of which: Figure 1 shows a perspective view of the parts of the trap in set position. Figure 2 represents a side elevation of the trap with a portion of the base broken away to show a bait-holder, with some of the parts in full lines in set position, and also in dotted lines indicating positions when thrown.

Like numerals on the different figures represent like parts. The numeral 3 represents a base block preferably of wood; 4 represents a metal jaw for striking and instantly killing animals, which is connected with the base in the usual manner comprising a coil spring 5 wrapped around a cross staple 6 with one end of the spring 5' rested on the block and the opposite end 5'' bent beneath the jaw to assist in projecting the same for striking the animal. The jaw is preferably provided with a central loop 7 bent at right angles therewith to provide stabilizing means to aid the operator in setting the same without danger from premature release, and also for a guide for the holding bar to maintain the same centrally with the jaw when thrown. A bar 8 is provided at one end with an eye 9 which is pivotally connected to one end of the base by a staple 10, and the other free end is provided with a downward and backward turned hook 11 for retaining the bar over the jaw when compressed in set position as shown in full lines.

Forward from the pivot 6 and spring, is an L shaped trigger pivotally connected to the base by a staple 12. The longer leg 13 of the trigger is extended forwardly in a generally horizontal position to provide a tripping lever. The shorter leg 14 is extended perpendicularly for a crank and terminates in the forwardly bent lip or latch 15, for normally retaining the bar in position over the jaw when compressed in set position. The base block is preferably provided with a small cavity 16 or other means such as pins 16' and 16'' for retaining any soft or suitable bait indicated as 17 for inducing the animal to place his head beneath the lever and lift the same for releasing the jaw, which is then impelled forward by the spring for striking the animal.

The hook 11 being necessarily turned down beneath the bar would ordinarily lie in the pathway of the jaw and so obstruct the same in passage when raised. In order to prevent the jaw from being so obstructed, it is necessary to provide means for raising the hook above the arc or line of travel of the jaw. I have, therefore, prepared for this purpose a curved arm 18 with its rear end attached to the bar or integral therewith. The arm is normally extended forwardly in a diverging and curved line from the bar and beneath the same, so that its forward end 19 will be depressed near the base when the bar is in position over the jaw when set. When the trigger latch is loosened from the hook, the jaw raises the bar which swings over the arc beneath the curved arm which rides in the offset groove of the jaw, and so elevates the hook on the bar above the pathway of the jaw to a position where the jaw will clear the hook before the latter can drop into the pathway of the jaw, as shown in dotted line of Figure 2. In some cases, it is advisable to construct the arm of thin spring material and extend the tip 19 in compressed relation against the drop of the base when the trap is set, so that when sprung the resilient arm will rise and throw the bar clear from the jaw.

After having constructed and used a trap made with the described down bent hook and an arm for raising the same above the pathway of the jaw, I have found it most practical in use and that whenever sprung by an animal, the jaw strikes the animal without being obstructed by the hook.

Having described my invention, I claim as new:

1. In a trap of the class described, comprising a base, an animal engaging spring jaw, a right angled bend in the center of the jaw to provide a stabilizing bed for an arm and retaining bar across the jaw, a bar for retaining the jaw normally retracted against the spring, and pivotally connected to the base at one end, a downwardly and backwardly turned hook on the other end of the bar, a trigger pivotally connected to the base with a forwardly turned lip for engaging the hook to retain the bar across the jaw when set, a lever projected horizontally forward from the trigger and adapted to be raised by the head of an animal, means for retaining bait beneath the lever in spaced relation therefrom for attracting animals, an arm attached at one end thereof to the pivoted end of the bar, and curved forwardly and downwardly away from the bar, and adapted to carry the bar and hook free from the jaw and path of travel thereof when the lip is withdrawn from the hook by the lever.

2. A trap comprising a base for supporting a spring actuated jaw for killing animals, a loop in the jaw bent at right angles therewith to facilitate the setting of the trap, and to provide a bed for stabilizing and guiding a retaining bar and arm, a bar for normally sustaining the jaw in set position against the tension of the spring and connected at one end by a pivot to the base, a downwardly and rearwardly turned hook on the other end of the bar for engaging a trigger latch, a trigger connected by a pivot adjacent the opposite end of the base, one end of the trigger being extended forward horizontally for a tripping lever, and the other end being extended upwardly for a crank and having a forwardly extended latch thereof for retaining the hook and bar against the spring tension and adapted to be drawn backward from the hook when the lever is raised, and means for sustaining a bait upon the base in spaced relation from and beneath the lever to attract the head of animals beneath the lever for raising the same.

3. An animal trap, comprising a supporting base, a spring jaw pivotally connected to the top of the base, means for holding a bait adjacent one end of the base, a bar for retaining the jaw in set position and being pivotally connected to the base near the other end thereof, a downwardly and backwardly turned hook on the free end of the bar, for engaging a trigger, an L shaped trigger member the longer end thereof being extended forwardly over the position of the bait, for a tripping lever and the shorter end of the trigger being extended upwardly for a crank and having a lip turned forwardly for engaging the hook and adapted to release the bar from the jaw when the lever is raised, an arm projected forwardly and downwardly from the bar adjacent the pivotal end thereof for raising the bar and hook above the line of travel of the jaw when released by the trigger, and to prevent the hook from retarding the jaw.

THEODORE R. H. SCHMIDT.